United States Patent
Jia et al.

(10) Patent No.: US 10,355,901 B2
(45) Date of Patent: Jul. 16, 2019

(54) METHOD FOR TRANSMITTING A REFERENCE SIGNAL HAVING A LOW PEAK TO AVERAGE POWER RATIO

(71) Applicants: Ming Jia, Ottawa (CA); Jianglei Ma, Ottawa (CA)

(72) Inventors: Ming Jia, Ottawa (CA); Jianglei Ma, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 15/782,400

(22) Filed: Oct. 12, 2017

(65) Prior Publication Data
US 2018/0241603 A1 Aug. 23, 2018

Related U.S. Application Data

(60) Provisional application No. 62/460,473, filed on Feb. 17, 2017.

(51) Int. Cl.
- H04L 27/26 (2006.01)
- H04J 13/00 (2011.01)
- H04J 11/00 (2006.01)

(52) U.S. Cl.
CPC ...... H04L 27/2614 (2013.01); H04J 13/0062 (2013.01); H04L 27/2634 (2013.01); H04L 27/2666 (2013.01); *H04J 2011/0009* (2013.01)

(58) Field of Classification Search
CPC ............ H04L 27/2614; H04L 27/2634; H04L 27/2666; H04J 13/0062
See application file for complete search history.

(56) References Cited

U.S. PATENT DOCUMENTS

| | | | |
|---|---|---|---|
| 9,673,950 B2 * | 6/2017 | Noh | H04L 1/1893 |
| 10,122,528 B2 * | 11/2018 | Lei | H04L 7/041 |
| 2008/0101520 A1 * | 5/2008 | Huang | H04L 27/2656 375/371 |

(Continued)

FOREIGN PATENT DOCUMENTS

| | | |
|---|---|---|
| CN | 105794165 A | 7/2016 |
| WO | 2009021375 A1 | 2/2009 |

OTHER PUBLICATIONS

3GPP TS 36.211, V8.6.0, 3rd Generation Partnership Project; Technical Specification Group Radio Access Network; Evolved Universal Terrestrial Radio Access (E-UTRA); Physical Channels and Modulation (Release 8), Mar. 2009, pp. 1-83.

(Continued)

*Primary Examiner* — Chi H Pham
*Assistant Examiner* — Weibin Huang (57) ABSTRACT

Aspects of the description provide a method and devices to allow frequency domain spectral shaping (FDSS) to be used on both a reference sequence and data to enable low PAPR. Being able to use FDSS on both the reference sequence and data allows the FDSS to be transparent to the receiver. The method comprises obtaining a first sequence, wherein the first sequence is a base sequence of a set of base sequences, the set of base sequences comprising sub group base sequences, the first sequence obtained by cyclically repeating the sub group sequences at least once; and transmitting, by the device, a reference signal based on the first sequence.

18 Claims, 8 Drawing Sheets

(56) References Cited

U.S. PATENT DOCUMENTS

| | | | | |
|---|---|---|---|---|
| 2010/0157918 | A1* | 6/2010 | Kim, II | H04L 5/0023 370/329 |
| 2012/0069933 | A1* | 3/2012 | Hao | H04W 74/0866 375/308 |
| 2012/0320880 | A1* | 12/2012 | Han | H04L 5/001 370/335 |
| 2013/0039285 | A1* | 2/2013 | Sorrentino | H04L 5/0091 370/329 |
| 2013/0189930 | A1 | 7/2013 | Kinnunen et al. | |
| 2016/0323129 | A1 | 11/2016 | Wang | |
| 2017/0366377 | A1* | 12/2017 | Papasakellariou | H04L 1/0026 |
| 2018/0288657 | A1* | 10/2018 | Stojanovski | H04W 36/0055 |

OTHER PUBLICATIONS

3GPP TSG RAN WG1 #42 on LTE, R1-050702, "DFT-Spread OFDM with Pulse Shaping Filter in Frequency Domain in Evolved UTRA Uplink", NTT DoCoMo, NEC, Sharp, London, United Kingdom, Aug. 29-Sep. 2, 2005, pp. 1-8.

* cited by examiner

METHOD FOR TRANSMITTING A REFERENCE SIGNAL HAVING A LOW PEAK TO AVERAGE POWER RATIO

RELATED APPLICATIONS

This application claims priority to U.S. Provisional Application No. 62/460,473 filed on Feb. 17, 2017, which is incorporated herein by reference in its entirety.

TECHNICAL FIELD

The present invention relates generally to telecommunications, and in particular embodiments, to systems and methods for a low peak to average power ratio (PAPR) reference signal.

BACKGROUND

OFDM systems are known to have high peak to average power ratios (PAPR) as compared to single carrier systems. Having a higher PAPR may ultimately be detrimental to the efficiency of a power amplifier of a transmitter. Therefore, having a higher PAPR may be a bigger problem in the uplink direction where the transmitter is a user equipment (UE) having a limited battery power source.

Frequency Domain Spectrum Shaping (FDSS) may be helpful in reducing PAPR for data transmission. If FDSS is to be used for data transmission, then to be transparent, FDSS should also be used for reference signals so that channel estimation is appropriate to the data transmission.

However, methods for providing FDSS to currently accepted reference signals are not particularly effective for reducing PAPR. Therefore, alternative selection of reference signals, that provide an acceptable PAPR, when FDSS is applied to the reference signal, would be beneficial.

BRIEF DESCRIPTION OF THE DRAWINGS

For a more complete understanding of the present invention, and the advantages thereof, reference is now made to the following descriptions taken in conjunction with the accompanying drawings, in which.

SUMMARY

Some embodiments provide a method to allow frequency domain spectral shaping (FDSS) to be used on both a reference sequence and data to enable low PAPR. Being able to use FDSS on both the reference sequence and data allows the FDSS to be transparent to the receiver. The method comprises obtaining, by a device, a first sequence, wherein the first sequence is a base sequence of a set of base sequences, the set of base sequences comprising sub group base sequences, the first sequence obtained by cyclically repeating the sub group sequences at least once; and transmitting, by the device, a reference signal based on the first sequence.

In some embodiments, the length of base sequences is m, the length of sub group base sequences is n, and m is equal to, or greater than, 2n+1.

In some embodiments, the base sequence is $$\vec{r}(n) = x_q(n \bmod N_{ZC}^{RS}),\ 0 \le n < M_{sc}^{RS},$$

where a $q^{th}$ root Zadoff-Chu sequence is defined by $$x_q(m) = \exp\left(-j\frac{\pi qm(m+1)}{N_{ZC}^{RS}}\right),\ 0 \le m \le N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $M_{sc}^{RS}/2$.

In some embodiments, the length of base sequences is m, the length of sub group base sequences is n, and m is equal to, or greater than, 1.5n+1.

In some embodiments, the base sequence is $$\vec{r}(n) = x_q(n \bmod N_{ZC}^{RS}),\ 0 \le n < M_{sc}^{RS},$$

where a $q^{th}$ root Zadoff-Chu sequence is defined by $$x_q(m) = \exp\left(-j\frac{\pi qm(m+1)}{N_{ZC}^{RS}}\right),\ 0 \le m \le N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $\eta M_{SC}^{RS}$ where $½ \le \eta \le ⅔$.

Based on the above method, a Zadoff-Chu sequence is selected based on a sequence length that is a prime number less than half the reference sequence length, so that at least two complete cycles of the Zadoff-Chu sequence are used to generate a base sequence that is used to generate a reference sequence.

In some embodiments, the sequence index of the first sequence is derived by cell ID.

In some embodiments, the sequence index of the first sequence is obtained by the following:

$$q=\lfloor \bar{q}+\tfrac{1}{2} \rfloor+v\cdot(-1)^{\lfloor 2\bar{q} \rfloor}$$

$$\bar{q}=N_{ZC}^{RS}\cdot(u+1)/31$$

wherein q is the sequence index of the first sequence, u is sequence group number, v is the base sequence number for each sequence group and $N_{ZC}^{RS}$ is a length of the sub group base sequences.

In some embodiments, the sequence index of the first sequence is obtained by the following:

$$q=\lfloor N_{ZC}^{RS}(u+1)/31+\tfrac{1}{2} \rfloor$$

wherein q is the sequence index of the first sequence, u is sequence group number and $N_{ZC}^{RS}$ is a length of the sub group base sequences.

In some embodiments, prior to transmitting the reference signal the method further comprises frequency domain spectral shaping (FDSS) the reference signal in the same manner as data for transmission.

In some embodiments, the data for transmission is a Discrete Fourier Transform spread Orthogonal Frequency Division Multiplexing (DFT-s-OFDM) signal that is modulated with π/2 Binary phase Shift Keying (BPSK).

In some embodiments, the reference signal is for enhanced Mobile BroadBand (eMBB) uplink data for up to 40 GHz.

According to some aspects there is provided a device comprising: a sequence obtaining unit configured to obtain, by the device, a first sequence, wherein the first sequence is a base sequence of a set of base sequences, the set of base sequences comprising sub group base sequences, the first sequence obtained by cyclically repeating the sub group sequences at least once; and a transmitter configured to transmit a reference signal based on the first sequence.

In some embodiments, the length of base sequences is m, the length of sub group base sequences is n, and m is equal to, or greater than, 2n+1.

In some embodiments, the base sequence is $$\bar{r}(n)=x_q(n \bmod N_{ZC}^{RS}), 0 \leq n < M_{sc}^{RS},$$

where a $q^{th}$ root Zadoff-Chu sequence is defined by $$x_q(m) = \exp\left(-j\frac{\pi q m(m+1)}{N_{ZC}^{RS}}\right), 0 \leq m \leq N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $M_{sc}^{RS}/2$.

In some embodiments, the length of base sequences is m, the length of sub group base sequences is n, and m is equal to, or greater than, 1.5n+1.

In some embodiments, the base sequence is $$\bar{r}(n)=x_q(n \bmod N_{ZC}^{RS}), 0 \leq n < M_{sc}^{RS},$$

where a $q^{th}$ root Zadoff-Chu sequence is defined by $$x_q(m) = \exp\left(-j\frac{\pi q m(m+1)}{N_{ZC}^{RS}}\right), 0 \leq m \leq N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $\eta M_{sc}^{RS}$ where $\tfrac{1}{2} \leq \eta \leq \tfrac{2}{3}$.

In some embodiments, the sequence index of the first sequence is derived by cell ID.

In some embodiments, the sequence index of the first sequence is obtained by the following:

$$q=\lfloor \bar{q}+\tfrac{1}{2} \rfloor+v\cdot(-1)^{\lfloor 2\bar{q} \rfloor}$$

$$\bar{q}=N_{ZC}^{RS}\cdot(u+1)/31$$

wherein q is the sequence index of the first sequence, u is sequence group number, v is the base sequence number for each sequence group.

In some embodiments, the sequence index of the first sequence is obtained by the following:

$$q=\lfloor N_{ZC}^{RS}(u+1)/31+\tfrac{1}{2} \rfloor$$

wherein q is the sequence index of the first sequence, u is sequence group number and $N_{ZC}^{RS}$ is a length of the sub group base sequences.

In some embodiments, the device may further include a spectral shaper unit configured to perform frequency domain spectral shaping of the reference signal in the same manner as data for transmission.

In some embodiments, the device may further include a modulator configured to modulate data for transmission using π/2 Binary Phase Shift Keying (BPSK) and wherein the data for transmission is a Discrete Fourier Transform spread Orthogonal Frequency Division Multiplexing (DFT-s-OFDM) signal.

In some embodiments, the reference signal is for enhanced Mobile BroadBand (eMBB) uplink data for up to 40 GHz.

According to some aspects, there is provided a computer-readable medium having stored thereon, computer-executable instructions that when executed by a processor, perform a method comprising: obtaining a first sequence, wherein the first sequence is a base sequence of a set of base sequences, the set of base sequences comprising sub group base sequences, the first sequence obtained by cyclically repeating the sub group sequences at least once; and transmitting a reference signal based on the first sequence.

In some embodiments, the length of base sequences is m, the length of sub group base sequences is n, and m is equal to, or greater than, 2n+1.

In some embodiments, the length of base sequences is m, the length of sub group base sequences is n, and m is equal to, or greater than, 1.5n+1.

DETAILED DESCRIPTION OF ILLUSTRATIVE EMBODIMENTS

The structure, manufacture and use of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
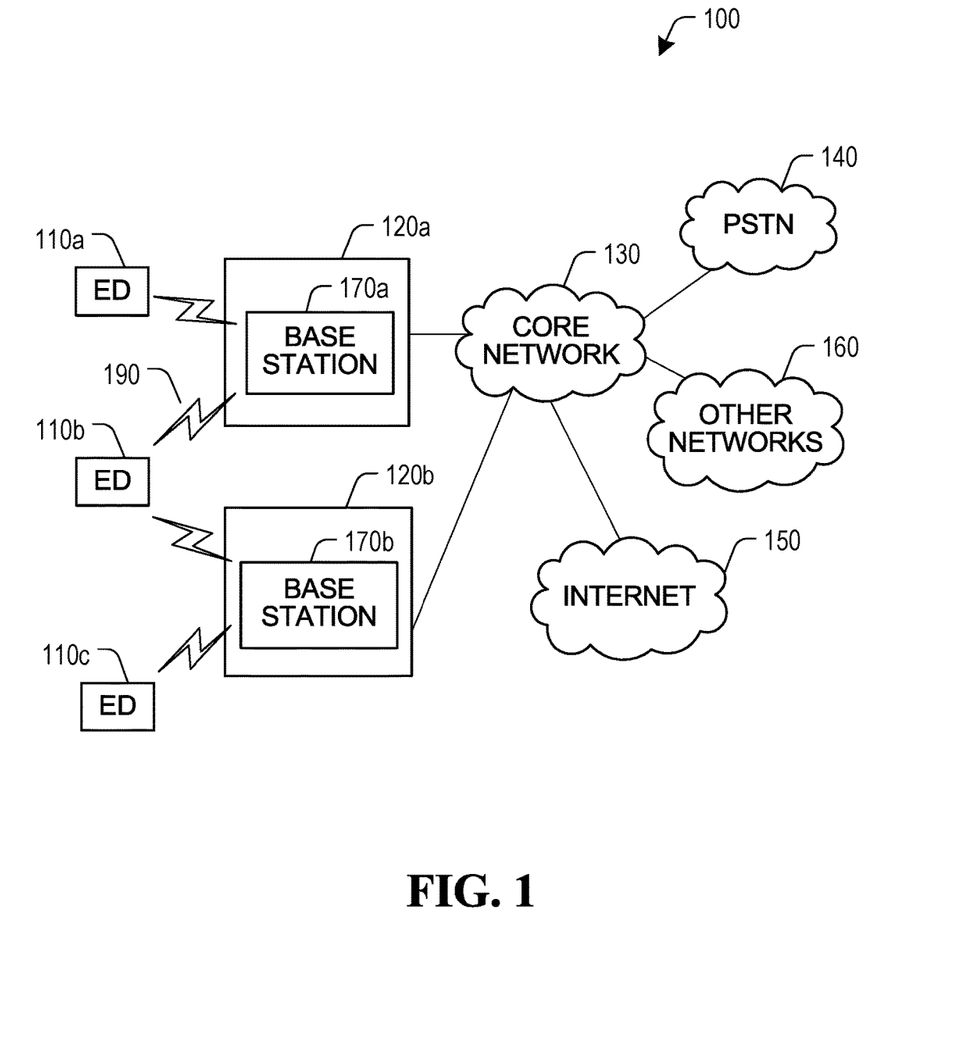
FIG. 1 illustrates a block diagram of a wireless network for communicating data.

FIG. 1 illustrates an example communication system 100 in which embodiments of the present disclosure could be implemented. In general, the system 100 enables multiple wireless or wired users to transmit and receive content (voice, data, video, text) via broadcast, narrowcast, user device to user device, etc. The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The EDs 110a-110c are configured to operate, communicate, or both in the system 100. For example, the EDs 110a-110c are configured to transmit, receive, or both via wireless or wired communication channels. Each ED 110a-110c represents any suitable end user device for wireless operation and may include such devices (or may be referred to) as a user equipment/device (UE), wireless transmit/receive unit (WTRU), mobile station, fixed or mobile subscriber unit, cellular telephone, station (STA), machine type communication device (MTC), personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the EDs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a gNodeB (sometimes called a "gigabit" NodeB), a transmission point (TP), a transmit/receive point (TRP), a site controller, an access point (AP), or a wireless router. The EDs 110a-110c may be alternatively or jointly configured to interface, access or communicate with other base station 170a-170b, the internet 150 and may access the core network 130, the PSTN 140, and/or the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A coverage area may be also referred to as a cell. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, multiple-input multiple-output (MIMO) technology may be employed having multiple transceivers for each coverage area. The number of RAN 120a-120b shown is exemplary only. Any number of RAN may be contemplated when devising the system 100.

The base stations 170a-170b communicate with one or more of the EDs 110a-110c over one or more air interfaces 190 using wireless communication links e.g. RF, µWave, IR, etc. The air interfaces 190 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

It is contemplated that the system 100 may use multiple channel access functionality, including such schemes as described above. In particular embodiments, the base stations and EDs implement LTE, LTE-A, and/or LTE-B. Of course, other multiple access schemes and wireless protocols may be utilized. A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with voice, data, application, Voice over Internet Protocol (VoIP), or other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access for other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing plain old telephone service (POTS). Internet 150 may include a network of computers and subnets (intranets) or both, and incorporate protocols, such as IP, TCP, UDP. EDs 110a-110c may be multimode devices capable of operation according to multiple radio access technologies, and incorporate multiple transceivers necessary to support such. Instead of wireless communication (or in addition thereto), the EDs may communicate via wired communication channels to a service provider or switch (not shown), and to the internet 150.

Although FIG. 1 illustrates one example of a communication system, various changes may be made to FIG. 1. For example, the communication system 100 could include any number of EDs, base stations, networks, or other components in any suitable configuration.

Figure 2A:
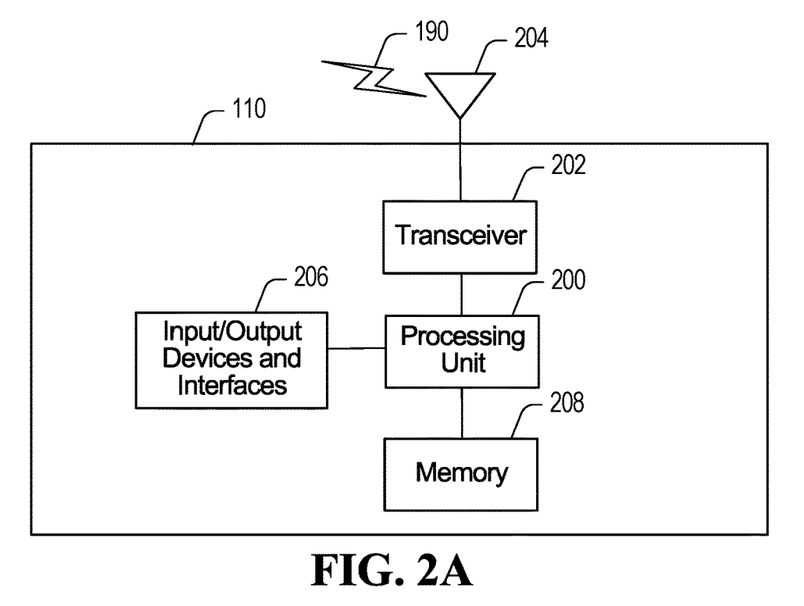
FIG. 2A illustrates an example Electronic Device (ED) structure according to FIG. 1.
Figure 2B:
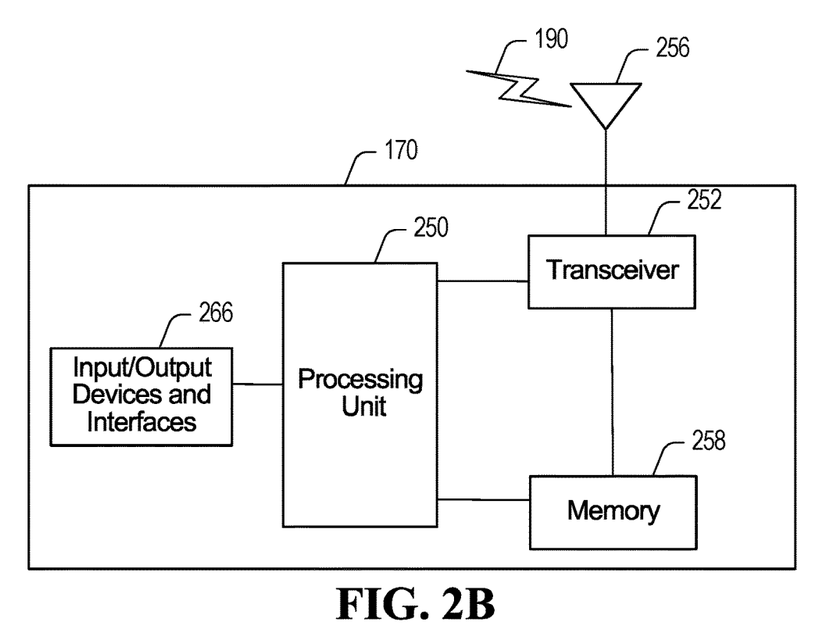
FIG. 2B illustrates an example base station structure according to FIG. 1.

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 may also be configured to support the methods and teachings described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit. While only a single processing unit is shown in FIG. 1, there could be multiple processing units within ED 110a performing the above described operations.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless or wired transmission and/or processing signals received wirelessly or by wire. Each antenna 204 includes any suitable structure for transmitting and/or receiving wireless or wired signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces (such as a wired interface to the internet 150). The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transceiver 252, which includes functionality for a transmitter and a receiver, one or more antennas 256, at least one memory 258, and one or more input/output devices or interfaces 266. A scheduler 253, which would be understood by one skilled in the art, is coupled to the processing unit 250. The scheduler 253 could be included within or operated separately from the base station 170. The processing unit 250 implements various processing operations of the base station 170, such as signal coding, data processing, power control, input/output processing, or any other functionality. The processing unit 250 can also support the methods and teachings described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transceiver 252 includes any suitable structure for generating signals for wireless or wired transmission to one or more EDs or other devices. Each transceiver 252 further includes any suitable structure for processing signals received wirelessly or by wire from one or more EDs or other devices. Although shown combined as a transceiver 252, a transmitter and a receiver could be separate components. Each antenna 256 includes any suitable structure for transmitting and/or receiving wireless or wired signals. While a common antenna 256 is shown here as being coupled to the transceiver 252, one or more antennas 256 could be coupled to the transceiver(s) 252, allowing separate antennas 256 to be coupled to the transmitter and the receiver if equipped as separate components. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 facilitates interaction with a user or other devices (network communications) in the network. Each input/output device 266 includes any suitable structure for providing information to or receiving/providing information from a user, including network interface communications.

Additional details regarding the EDs 110 and the base stations 170 are known to those of skill in the art. As such, these details are omitted here for clarity.

Figure 3A:
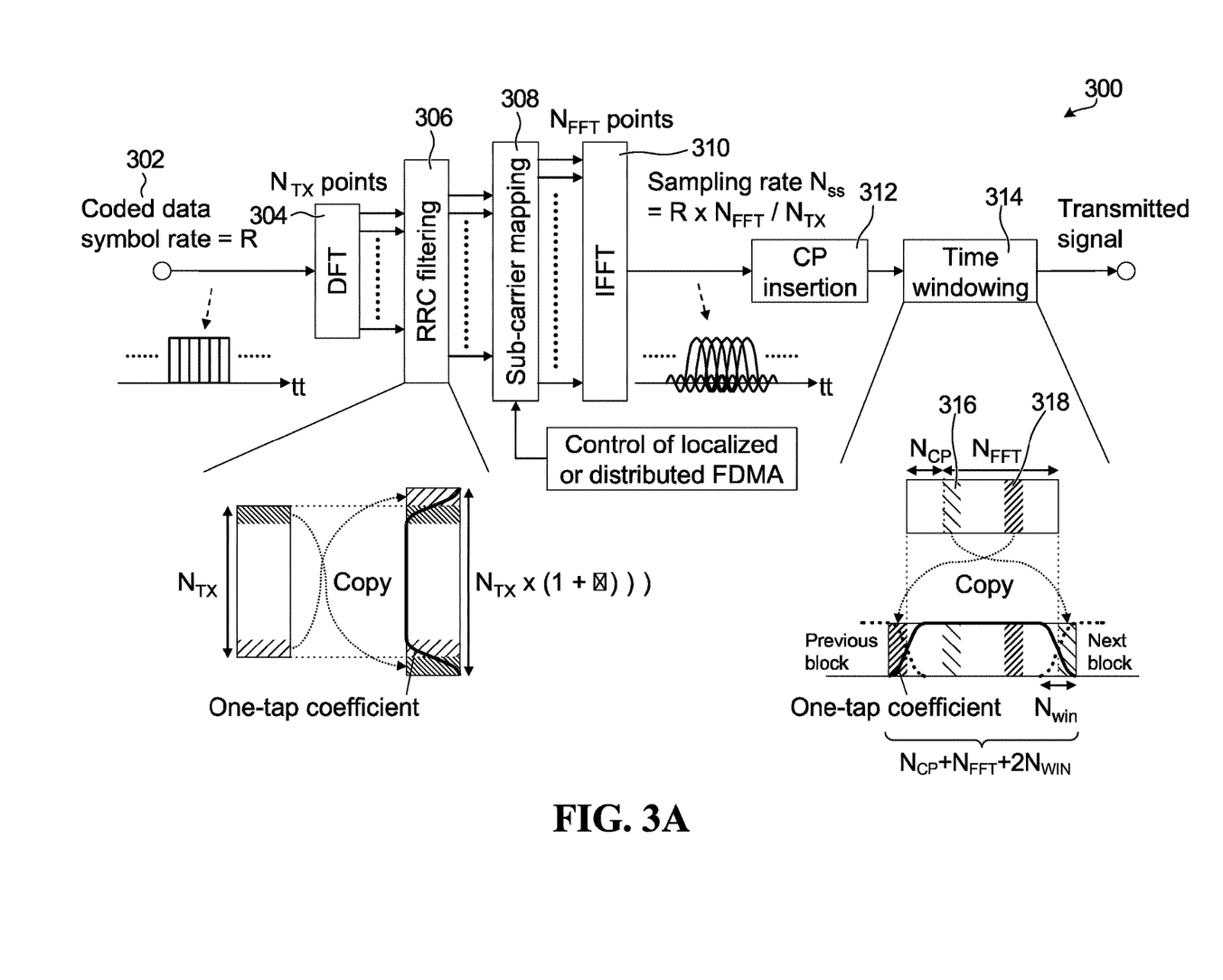
FIG. 3A is an example of a processing blocks in a transmitter which may be used to implement embodiments described in the application.

FIG. 3A illustrates a block diagram representation of processing blocks in a transmitter 300 configured to perform Frequency Domain Spectrum Shaping (FDSS) for a Discrete Fourier Transform spread Orthogonal Frequency Domain Multiplexing (DST-S-OFDM) scheme.

In FIG. 3A, a coded data 302 having a symbol rate of R is provided to a Discrete Fourier Transform (DFT) function 304. The DFT function 304 performs a transform generating $N_{TX}$ points. The output of the DFT function 304 is applied to a Raised Root Cosine (RRC) filtering window function 306 to perform frequency spectrum shaping of the signal. The output of the RRC filtering function 306 is applied to a sub-carrier mapping function 308. The sub-carrier mapping function 308 may also determine whether the sub-carrier mapping uses localized or distributed frequency domain multiple access (FDMA). The output of the sub-carrier mapping function 308 is applied to an Inverse Fast Fourier transform (IFFT) function 310 that performs the IFFT on $N_{FFT}$ points. The output of the IFFT function has a sampling rate of $N_s = R \times N_{FFT}/N_{TX}$. Following the IFFT function 310 a cyclic prefix insertion function 312 adds a cyclic prefix (CP) to the signal. Once the CP has been added, a time windowing function 314 replicates a portion of the $N_{FFT}$ points ($N_{win}$ 316) to the beginning of the total of $N_{CP}+N_{FFT}$ points and a different portion of the $N_{FFT}$ points (also $N_{win}$ 318) to the beginning of the total of $N_{CP}+N_{FFT}$ points. This $N_{CP}+N_{FFT}+2N_{win}$ element sequence is then ready for transmission.

At a corresponding receiver (not shown), frequency domain chase combining is performed at an edge of a sub-band, so that the Power Spectral Density (PSD) of the signal is not affected by the mask. Overhead for the transmission depends on a roll-off factor $\alpha$ of the root raised cosine (RRC) window, and the total required spectrum is $(1+\alpha)$ times that of the DFT-S-OFDM signal if no FDSS is utilized. The larger the value of $\alpha$, the better the PAPR reduction effect. However, the improved PAPR comes at the cost of a higher spectrum cost. Since PAPR reduction is more important for low SNR users, $\alpha$ can be an adjustable parameter.

Figure 4:
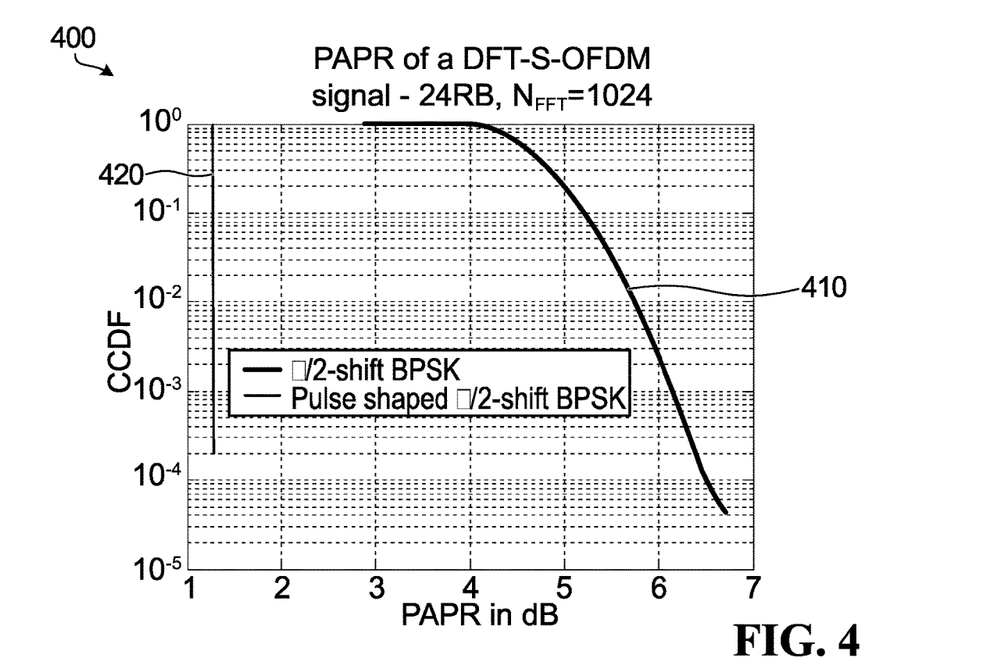
FIG. 4 is a graphical plot illustrating Peak to Average Power Ratio (PAPR) for a data transmission modulated using it/2 Binary phase Shift Keying (BPSK) with and without frequency domain pulse shaping.

Such a scheme can significantly lower the PAPR of a signal. For example, for a $\pi/2$ Binary phase Shift Keying (BPSK signal), with $\alpha=1$, the PAPR can be lowered by more than 4 dB. FIG. 4 is a graphical plot 400 illustrating PAPR for a data transmission modulated using $\pi/2$ BPSK with and without frequency domain pulse shaping. The x-axis of FIG. 4 is PAPR in dB and the y-axis is complementary cumulative distribution function (CCDF). For $\pi/2$ BPSK modulation without pulse shaping, it can be seen in the curve identified by reference character 410, FIG. 4 shows that 99% of signals will have a PAPR of 4 dB, 99.9% of signals will have a PAPR of 5.2 dB and 99.99% of signals will have a PAPR of 5.8 dB. On the other hand, with pulse shaping, it can be seen in the curve identified by reference character 420, up to 99.999% of signals will have a PAPR of 1.3 dB. The signals utilized for the plot are for a size of 24 Resource Blocks (RB) and have $N_{IFFT}=1024$.

With such a low PAPR for the data component of a signal, it is desirable to lower the PAPR of a reference signal, for example a DeModulation Reference Signal (DM-RS) of the signal, as well. One important difference between data and the DM-RS is that, in the frequency domain, a DM-RS sequence needs to be constant modulus. Current LTE DM-RS design is based on Zadoff-Chu (ZC) sequences, and its PAPR is still relatively high after up-sampling.

Figure 3B:
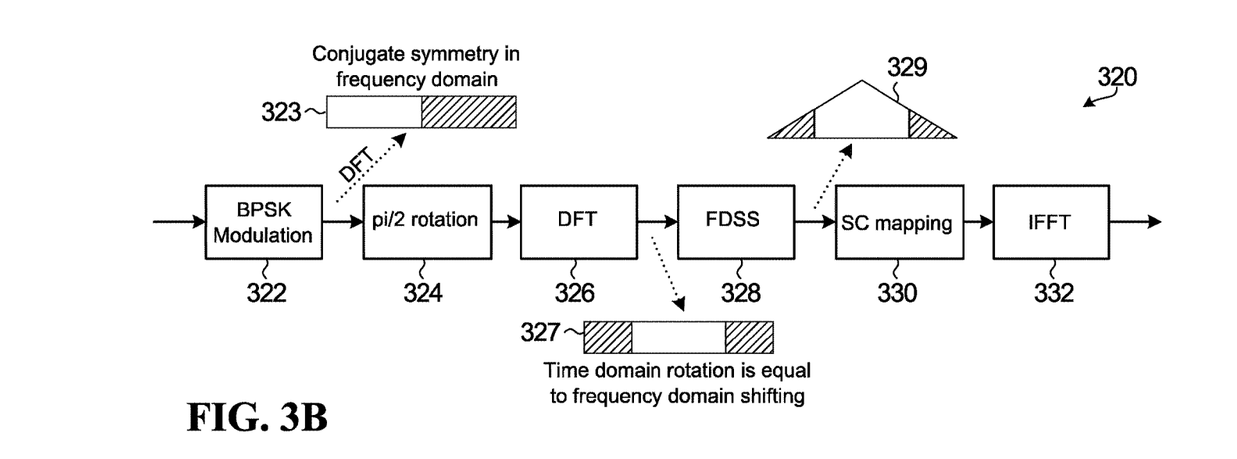
FIG. 3B is a further example of processing blocks in a transmitter which may be used to implement embodiments described in the application.

FIG. 3B shows an alternative set of processing blocks of a transmitter that could be used for transmission of a $\pi/2$-BPSK signal. A signal, such as a series of bits, is provided to a BSPK modulator 322. If the output of the BSPK modulator 322 was processed by a Discrete Fourier Transform (DFT) function the result would have a conjugate symmetry in the frequency domain, as illustrated at 322. The output of the BPSK modulator 322 is provided to a $\pi/2$ rotation function 324. The output of the $\pi/2$ rotation function 324 is provided to a DFT function 326. The output of the DFT function 326 is provided to a FDSS function 328. As can be seen at 327, a time domain rotation corresponds to a frequency domain shift. The output of the FDSS function 328 is applied to a sub-carrier mapping function 330. The output of the FDSS function 328 is shown to be shaped at 329, as compared to prior to FDSS function 328 at 327. The output of the sub-carrier mapping function 330 is applied to an IFFT function 332.

Figure 3C:
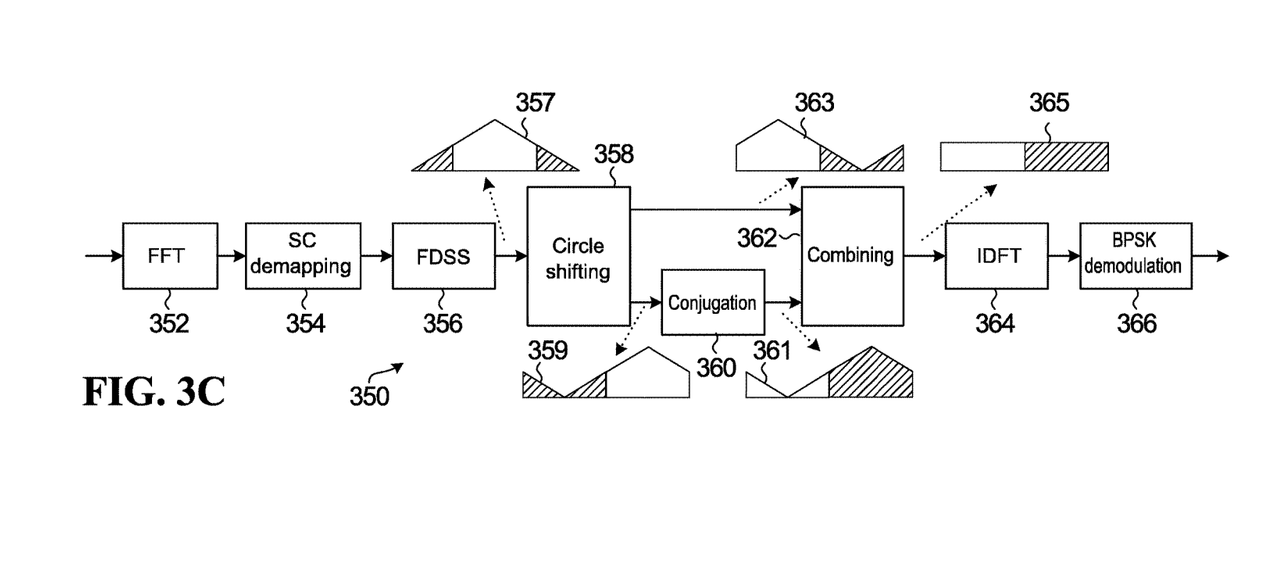
FIG. 3C is an example of processing blocks in a receiver which may be used to implement embodiments described in the application.

FIG. 3C shows an alternative set of processing blocks of a receiver that could be used for receiving a $\pi/2$-BPSK signal. A signal is received at the receiver and applied to an FFT function 352. The output of the FFT function 352 is applied to a sub-carrier demapping function 354. The output of the sub-carrier demapping function 354 is applied to FDSS function 356. A frequency domain representation of the signal output from the FDSS function 356 is shown at 357. The output of the FDSS function 356 is provided to a cyclic shifting processing function 358. A first output of the cyclic shifting processing function 358 is applied directly to a combiner 362. A second output of the cyclic shifting processing function 358 is applied to a conjugation function 360 and then on to the combiner 362. The combiner 362 combines the output of the cyclic shifting processing function 358 and the conjugate of the cyclic shifting processing function 358. The output of the combiner 362 is provided to an Inverse Discrete Fourier Transform (IDFT) function 264 and a BSPK demodulator 366. Frequency domain representations of the signal being processed are shown at 359, 361, 363 and 365.

A reference signal sequence $r_{u,v}^{(\beta)}(n)$ may be defined by a cyclic shift $\beta$ of a base sequence $\bar{r}_{u,v}(n)$ according to $$r_{u,v}^{(\beta)}(n) = e^{j\beta n} \bar{r}_{u,v}(n), \; 0 \le n < M_{sc}^{RS}$$

where $M_{sc}^{RS} = mN_{sc}^{RB}$ is the length of the reference signal sequence and $1 \le m \le N_{RB}^{max,UL}$, in which m defines a resource block (RB) number and $N_{sc}^{RB}$ is the number of sub-carriers in a RB. Multiple reference signal sequences can be defined from a single base sequence through different values of $\beta$.

Base sequences $\bar{r}_{u,v}(n)$ are divided into groups, where $u \in \{0, 1, \ldots, 29\}$ is the group number and v is the base sequence number within the group, such that each group contains one base sequence (v=0) of each length $M_{sc}^{RS} = mN_{sc}^{RB}$, $1 \le m \le 5$ and two base sequences (v=0, 1) of each length $M_{sc}^{RS} = mN_{sc}^{RB}$, $6 \le m \le N_{RB}^{max,UL}$. The sequence group number u and the number v within the group may vary in time. The definition of the base sequence $\bar{r}_{u,v}(0), \ldots, \bar{r}_{u,v}(M_{sc}^{RS}-1)$ depends on the sequence length $M_{sc}^{RS}$. In order to reduce inter-cell interference (ICI), neighbouring cells should select reference signal sequences from different base sequence groups.

In LTE, a reference signal sequence can be defined as follows:

The base sequence $\bar{r}(0), \ldots, \bar{r}(M_{sc}^{RS}-1)$ is given by $$\bar{r}(n) = x_q(n \bmod N_{ZC}^{RS}), \; 0 \le n < M_{sc}^{RS}$$

where the $q^{th}$ root Zadoff-Chu sequence is defined by $$x_q(m) = \exp\left(-j\frac{\pi q m(m+1)}{N_{ZC}^{RS}}\right), \; 0 \le m \le N_{ZC}^{RS}-1,$$

with q being an integer parameter determined by the group number and base sequence number within the group, and $N_{ZC}^{RS}$ being the length of the Zadoff-Chu sequence which is given by the largest prime number such that $N_{ZC}^{RS} < M_{sc}^{RS}$. The parameters n and m are integer index parameters. A value of $M_{sc}^{RS}$ is a bandwidth for uplink transmission, expressed as a number of subcarriers.

The value of integer parameter q is determined by a group number u and a base sequence number v within the group. In a particular example, q is given by $$q = \lfloor \bar{q}+1/2 \rfloor + v \cdot (-1)^{\lfloor 2\bar{q} \rfloor}$$

$$\bar{q} = N_{ZC}^{RS} \cdot (u+1)/31$$

There are two issues with this type of DM-RS. Firstly, it is desirable that the DM-RS is windowed in the same way as data, so that the window effect is reflected in channel estimation. However, when windowing the LTE DM-RS described above there are some detrimental effects to the reference signal.

Figure 5:
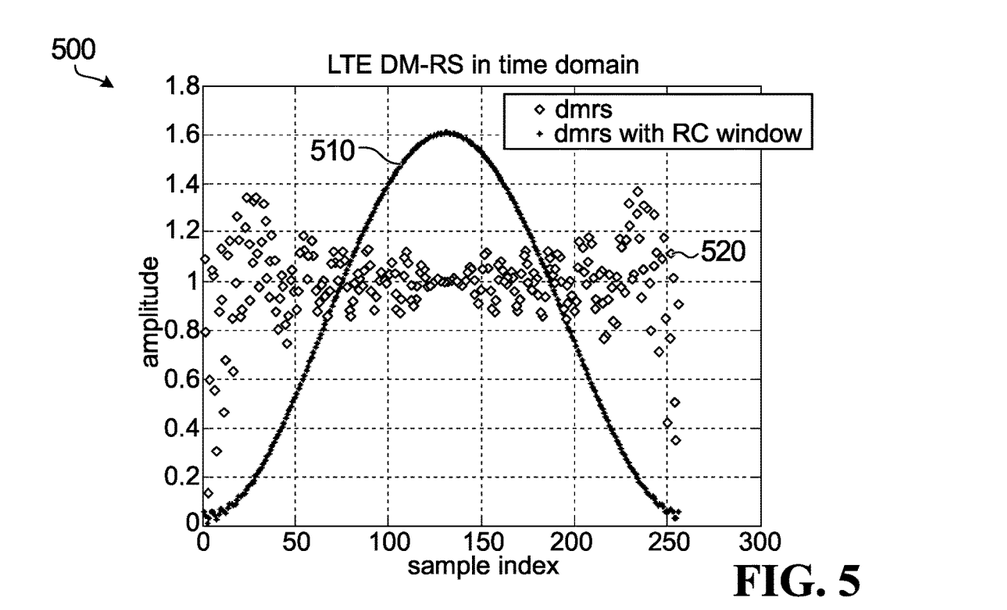
FIG. 5 is a graphical plot illustrating a normalized amplitude of a reference signal transmission with and without Raised Cosine (RC) pulse shaping wherein the reference signal is in accordance with LTE reference signal generation.

FIG. 5 is a graphical plot 500 illustrating a normalized amplitude of a reference signal transmission with, the curve identified by reference character 510, and without, the curve identified by reference character 520, Raised Cosine (RC) pulse shaping wherein the reference signal is in accordance with LTE reference signal generation described above. The x-axis of FIG. 5 is a sample index for approximately 256 points and the y-axis is a normalized amplitude. The plots 510,520 in FIG. 5 are generated based on a simulation using a DMRS sequence length of 60 and an IFFT size of 256 and applying a Raised Cosine (RC) window (plot 510) in the frequency domain. The DM-RS waveform (510) in the time domain shows a bell-shaped window and the PAPR is actually increased.

It should be noted that even without frequency domain windowing (520), the up-sampled DM-RS waveform has relatively high PAPR.

Proposed herein is an alternative to the relationship between $N_{ZC}^{RS}$ and $M_{sc}^{RS}$ that is used for the LTE DM-RS. In aspects of the present application the relationship between the length of the Zadoff-Chu sequence and the length of the reference signal is $N_{ZC}^{RS} < M_{sc}^{RS}/2$.

The Zadoff-Chu sequence is repeated at least once within the transmitted sequence of the overall DM-RS. In other words, if the Zadoff-Chu sequence has m elements, the Zadoff-Chu sequence is cyclically repeated so that if the reference signal has n elements, n is equal to, or greater than, 2m+1. The DM-RS is a sequence generated by a circularly extended Zadoff-Chu sequence, rather than a repetition of only a portion of LTE DM-RS. If there is no FDSS being performed on the reference sequence, then there may not be a considerable difference in performance between scenarios when the Zadofff-Chu sequence length is a only a single sequence length and a partial repetition and when the Zadofff-Chu sequence length is circularly repeated at least twice.

When FDSS is used however, the time domain pulse becomes wider, due to frequency domain windowing. To deal with a wider pulse in the time domain, the pulse interval of the time domain DMRS samples is increased. A repetition of a shorter sequence is similar to increasing the pulse interval. A single copy of the Zadoff-Chu sequence and only a partial repeat of that sequence result in a very small part of repetition. For example, a Zadoff-Chu sequence of length 59 and a reference sequence of length 60, results only in a repetition of one chip. A repetition of two times is a guideline for lowering the PAPR. If a single copy of the Zadoff-Chu sequence and only a partial repeat of the sequence can generate an RS sequence of length close to two times of the Zadoff-Chu sequence, then this may also lower the PAPR.

The UE, base station or a cell can generate the reference sequence based on the integer q parameter determined by the group number and base sequence number within the group. The UE, base station or cell can obtain the q parameter based on cell ID information and higher layer signaling. The q parameter is dependent upon group number (u), base sequence number (v) within group and the sequence length $M_{sc}^{RS}$, defined as a number of subcarriers. The sequence length $M_{sc}^{RS}$ is used to define the length of the Zadoff-Chu sequence $N_{ZC}^{RS}$ as described above. That is, the sequence length of the Zadoff-Chu sequence is a prime number that is less than half of the sequence length $M_{sc}^{RS}$. Based on the group number (u), base sequence number (v) within group and the Zadoff-Chu sequence length, q is obtained and is used to generate the reference sequence that satisfies the base sequence.

$\bar{r}(n) = x_q(n \bmod N_{ZC}^{RS})$, $0 \le n < M_{sc}^{RS}$, where a $q^{th}$ root Zadoff-Chu sequence is defined by $$x_q(m) = \exp\left(-j\frac{\pi qm(m+1)}{N_{ZC}^{RS}}\right), 0 \le m \le N_{ZC}^{RS} - 1.$$

In a particular example, q may be determined by $q = \lfloor \bar{q} + \frac{1}{2} \rfloor + v \cdot (-1)^{\lfloor 2\bar{q} \rfloor}$ $\bar{q} = N_{ZC}^{RS} \cdot (u+1)/31$ In a particular implementation q may be determined by $q = \lfloor N_{ZC}^{RS}(u+1)/31 + \frac{1}{2} \rfloor$ wherein q is the sequence index of the first sequence, u is sequence group number and $N_{ZC}^{RS}$ is a length of the sub group base sequences.

The above examples are simply two examples of how the sequence index may be determined. Other manners of determining the sequence index are contemplated. Further examples are described in U.S. patent application Ser. No. 12/493,869, assigned to the same assignee of the present application.

The following discussion is an example of a comparison between a LTE DM-RS signal and a reference signal created using the relationship defined herein for a reference signal having $M_{sc}^{RS}=60$. Based on description above for LTE DM-RS, the highest prime number less than 60 is 59, so a Zadoff-Chu sequence of length 59 is used for the DM-RS sequence, for example $x_q(0), \ldots, x_q(58), x_q(0)$;

According to an example of the presently disclosed rule for generating a DM-RS sequence, a highest prime number less than $M_{sc}^{RS}=60/2=30$ is 29. Therefore, a Zadoff-Chu sequence of length 29 is used for the DM-RS sequence, for example:

$x_q(0), \ldots, x_q(28), x_q(0), \ldots, x_q(28), x_q(0), x_q(1)$.

Figure 6:
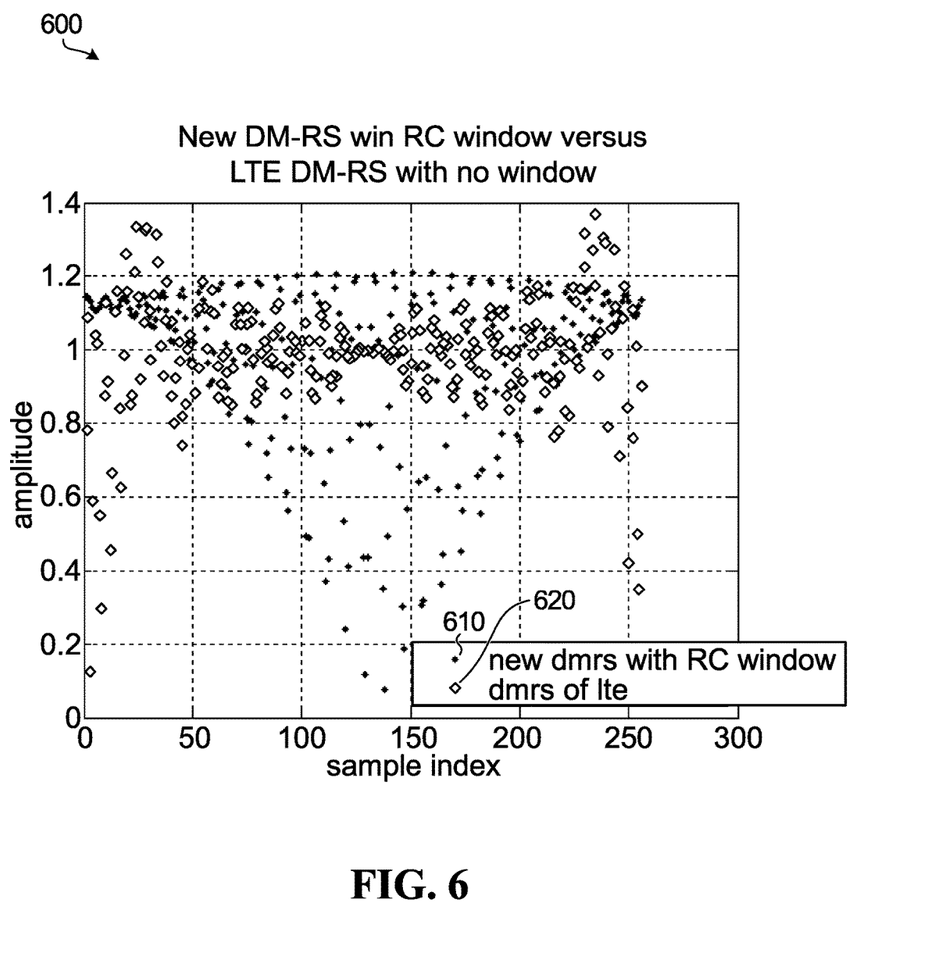
FIG. 6 is a graphical plot illustrating a normalized amplitude of a reference signal transmission with Raised Cosine (RC) pulse shaping wherein the reference signal is in accordance with reference signal generation according to an embodiment of the present application as compared to a reference signal transmission without Raised Cosine (RC) pulse shaping wherein the reference signal is in accordance with accepted LTE reference signal generation.

A comparison of the LTE DM-RS and a DM-RS based on the relations disclose herein is shown in FIG. 6. FIG. 6 is a graphical plot 600 illustrating a normalized amplitude of a reference signal transmission with Raised Cosine (RC) pulse shaping, the curve identified by reference character 610, wherein the reference signal is in accordance with reference signal generation according to an embodiment of the present application as compared to a reference signal transmission without Raised Cosine (RC) pulse shaping, the curve identified by reference character 620, wherein the reference signal is in accordance with accepted LTE reference signal generation. The x-axis of FIG. 6 is a sample index for approximately 256 points and the y-axis is a normalized amplitude. Both waveforms 610,620 have the same average power, however, the DM-RS signal based on an embodiment of the application has a PAPR of 1.67 dB versus the LTE DM-RS, which is a PAPR of 2.69 dB.

In aspects of the present application the relationship between the length of the Zadoff-Chu sequence and the length of the reference signal is $N_{ZC}^{RS} < \eta M_{sc}^{RS}$ where $\frac{1}{2} \le \eta \le \frac{2}{3}$.

The Zadoff-Chu sequence is partially repeated, i.e. at least more than half, within the transmitted sequence of the overall DM-RS. In other words, if the Zadoff-Chu sequence has m elements, the Zadoff-Chu sequence is cyclically repeated so that if the reference signal has n elements, n is equal to, or greater than, 1.5m+1. If there is no FDSS being performed on the reference sequence, then there may not be a considerable difference in performance between scenarios when the Zadofff-Chu sequence length is only a single sequence length and a partial repetition and when the Zadofff-Chu sequence length is repeated at least 1.5 times, based on the base sequence being $$\bar{r}(n)=x_q(n \bmod N_{ZC}^{RS}), 0 \leq n < M_{sc}^{RS},$$

where a $q^{th}$ root Zadoff-Chu sequence is defined by $$x_q(m) = \exp\left(-j\frac{\pi qm(m+1)}{N_{ZC}^{RS}}\right), 0 \leq m \leq N_{ZC}^{RS} - 1.$$

As a result, the value of $N_{ZC}^{RS}$ can be a largest prime number that is less than $\eta M_{sc}^{RS}$ where $\frac{1}{2} \leq \eta \leq \frac{2}{3}$.

Figure 7:
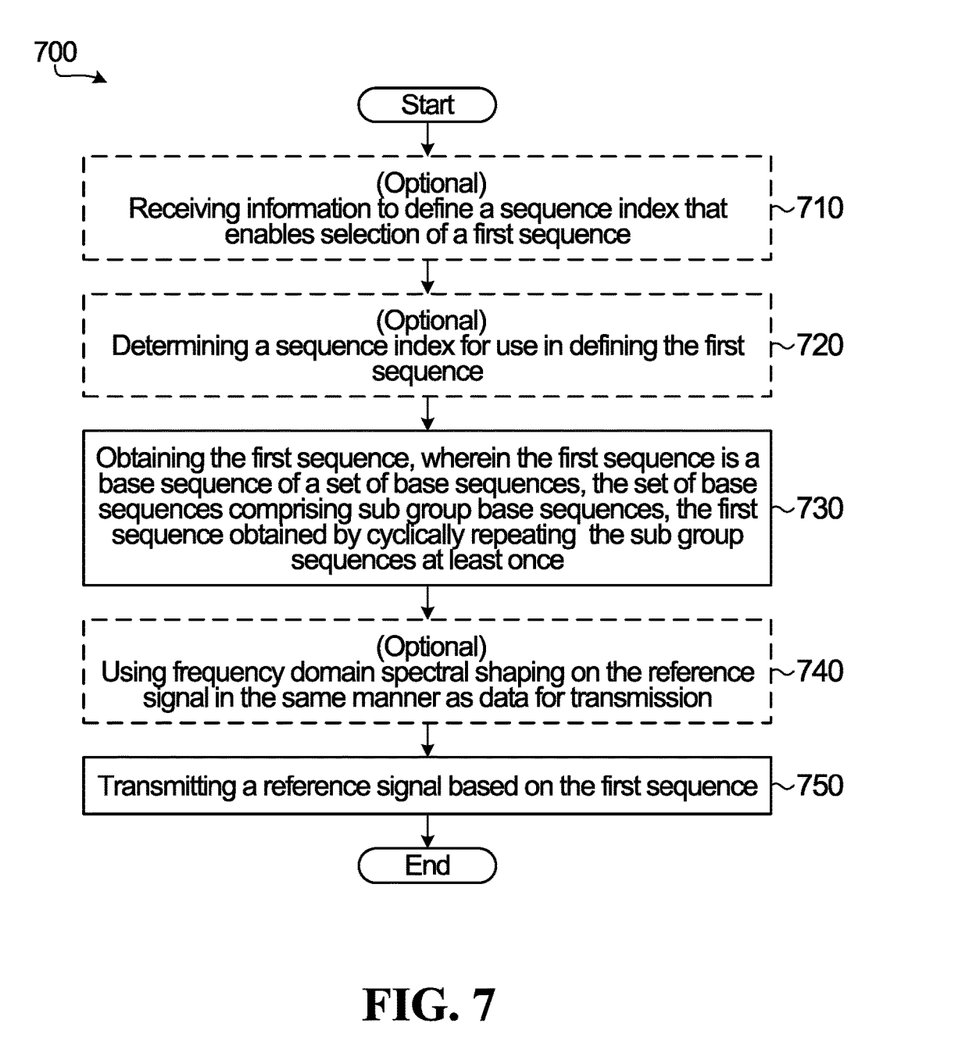
FIG. 7 is a flowchart for a method according to as aspect of the application.

FIG. 7 illustrates a flow chart 700 for implementing an example method according to an aspect of the application. The method is implemented from the perspective of a UE or a base station (BS) that needs to generate a reference sequence. A first optional step 710 of the method may include receiving information to define a sequence index q that enables selection of a first sequence. This information may be provided, for example, when the UE accesses the network and/or hands off between cells via higher layer signaling information. The information to define a sequence index q may be one or more of, but not limited to: cell ID information, group sequence information (u), base sequence information (v) associated with a group, a reference sequence length. A further optional step 720 involves determining the sequence index q for use in defining the first sequence. The sequence index may be dependent upon the group sequence information (u), base sequence information (v) and the length of the Zadoff-Chu sequence $N_{ZC}^{RS}$. As discussed above, the Zadoff-Chu sequence length is a function of the sequence length $M_{sc}^{RS}$, in particular the sequence length of the Zadoff-Chu sequence that is a prime number that is less than half of the sequence length $M_{sc}^{RS}$.

In a particular implementation of determining the sequence index for the first sequence, the sequence index is derived from:

$$q=\lfloor \bar{q}+\frac{1}{2} \rfloor + v \cdot (-1)^{\lfloor 2\bar{q} \rfloor}$$

$$\bar{q}=N_{ZC}^{RS} \cdot (u+1)/31$$

wherein q is the sequence index of the first sequence, u is sequence group number, v is the base sequence number for each sequence group and $N_{ZC}^{RS}$ is a length of the sub group base sequences.

In a particular implementation of determining the sequence index for the first sequence, the sequence index is derived from:

$$q=\lfloor N_{ZC}^{RS}(u+1)/31+\frac{1}{2} \rfloor$$

wherein q is the sequence index of the first sequence, u is sequence group number and $N_{ZC}^{RS}$ is a length of the sub group base sequences.

The above examples are simply two examples of how the sequence index may be determined. Other manners of determining the sequence index are contemplated. Further examples are described in U.S. patent application Ser. No. 12/493,869, assigned to the same assignee of the preset application.

A further step 730 involves obtaining the first sequence, wherein the first sequence is a base sequence of a set of base sequences, the set of base sequences comprising sub group base sequences, the first sequence obtained by cyclically repeating the sub group sequences at least once. The length of base sequences is m, the length of sub group base sequences is n, and m is equal to, or greater than, 2n+1.

In some embodiments, the base sequence is $$\bar{r}(n)=x_q(n \bmod N_{ZC}^{RS}), 0 \leq n < M_{sc}^{RS},$$

where a $q^{th}$ root Zadoff-Chu sequence is defined by $$x_q(m) = \exp\left(-j\frac{\pi qm(m+1)}{N_{ZC}^{RS}}\right), 0 \leq m \leq N_{ZC}^{RS} - 1,$$

wherein q is a sequence index, $N_{ZC}^{RS}$ is a length of the sub group base sequences and $M_{sc}^{RS}$ is length of the base sequence, wherein $N_{ZC}^{RS}$ is a largest prime number less than $M_{sc}^{RS}/2$.

A further optional step 740 involves using frequency domain spectral shaping on the reference signal in the same manner as data for transmission.

Step 750 involves transmitting a reference signal based on the first sequence.

In some embodiments, the data for transmission is a Discrete Fourier Transform spread Orthogonal Frequency Division Multiplexing (DFT-s-OFDM) signal that is modulated with π/2 BPSK.

Some implementations of the method of may be used for transmitting a reference signal for enhanced Mobile Broad-Band (eMBB) uplink data for up to 40 GHz.

It should be understood that a table may be used for providing values of the length of the sub group base sequences $N_{ZC}^{RS}$ or $\eta M_{sc}^{RS}$ for particular sizes of $M_{sc}^{RS}$, i.e. the length of the base sequence. Examples of values that may be used in such a table are provided below in Table 1.

TABLE 1

Length of sub group base sequences for different values of $M_{sc}^{RS}$

| $M_{sc}^{RS}$ | $\eta M_{sc}^{RS}$ ($\eta = 2/3$) | $N_{sc}^{RS}$ (largest prime number less than $M_{sc}^{RS}/2$.) | $N_{sc}^{RS}$ (LTE) |
|---|---|---|---|
| 2 × 12 | 16 | 13 | 23 |
| 3 × 12 | 24 | 23 | 31 |
| 4 × 12 | 32 | 31 | 47 |
| 5 × 12 | 40 | 37 | 59 |
| 6 × 12 | 48 | 47 | 71 |
| 8 × 12 | 64 | 61 | 89 |
| 10 × 12 | 80 | 79 | 113 |
| 12 × 12 | 96 | 89 | 139 |
| . | . | . | . |
| . | . | . | . |
| . | . | . | . |

Table 1 shows a portion of a complete table for particular sizes of $M_{sc}^{RS}$, based on the above equation and values of the length of the sub group base sequences $N_{ZC}^{RS}$ or $\eta M_{sc}^{RS}$. The contents of a table such as Table 1 can be derived to form a complete table and a UE and BS can save the complete table to use as part of performing a lookup table operation.

It is to be understood that not all of the information provided in the table above would necessarily appear in a table used to define the values of the length of the sub group base sequences. Furthermore, the example values shown in the table are a non-exhaustive list of examples and one skilled in the art would understand how further permutations could be defined based on the particular examples.

The table could be accessed and once pertinent numbers are obtained, the reference signal based on a first sequence, as described above, can be determined.

In some embodiments, once multiple reference signals are generated based on the relationship described above, the reference signals may be stored in a memory in the UE. The reference signal may be stored in a manner that an index for a lookup table may be used to select a desired reference signal based on information defined by the network and provided to the UE.

Figure 8:
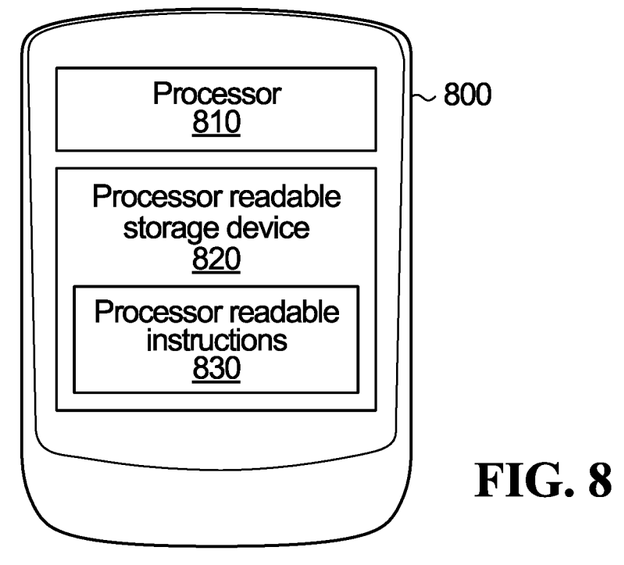
FIG. 8 is a block diagram illustrating an example device according to an aspect of the present application.

FIG. 8 is a block diagram of an example apparatus 800 that operates according to aspects of the application as described herein. The example apparatus 800 may be a user-side device for accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

The apparatus thus may have various elements that would normally be a part of such an apparatus, such as a key pad, display screen, speaker, microphone, etc. The example apparatus 800 includes a processor 810 and a processor readable storage device 820. The processor readable storage device 820 has stored thereon processor executable instructions 830 that when executed by the processor cause the processor to perform a method consistent with the methods described above.

The processor 810 and/or processor executable instructions 830 stored on the readable storage device 820 may include any component or collection of components adapted to convert a baseband signal into a data signal and/or reference signal suitable for communication over a device-side interface(s), or vice-versa. The device-side interface(s) may include any component or collection of components adapted to communicate data-signals between the processor 810 and components within the host device (e.g., the processing system 800, local area network (LAN) ports, etc.). Components that may be included in the processor 810 or stored on the readable storage device 820 in the form of processor executable instructions 830 may include a sequence obtaining unit configured to obtain a first sequence, wherein the first sequence is a base sequence of a set of base sequences, the set of base sequences comprising sub group base sequences, the first sequence obtained by cyclically repeating the sub group sequences at least once.

The apparatus 800 may transmit and receive signaling over any type of communications medium. In some embodiments, the apparatus 800 transmits and receives signaling over a wireless medium. For example, the apparatus 800 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

The apparatus 800 may include one or more antenna/radiating elements. For example, the apparatus 800 may include a single antenna, multiple separate antennas, or a multi-antenna array configured for multi-layer communication, e.g., single input multiple output (SIMO), multiple input single output (MISO), multiple input multiple output (MIMO), etc. Specific processing systems and/or transceivers may utilize all of the components shown, or only a subset of the components, and levels of integration may vary from device to device.

Figure 9:
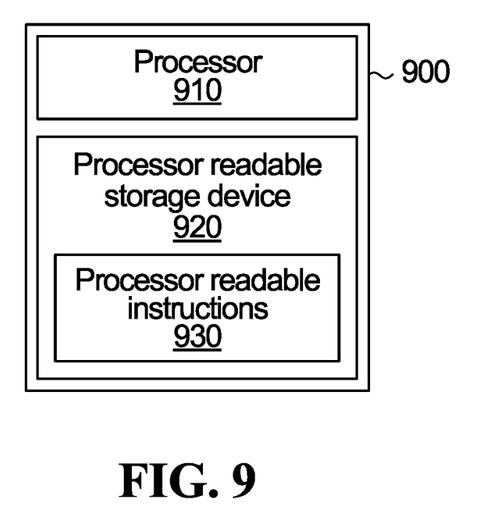
FIG. 9 is a block diagram illustrating another example device according to an aspect of the present application.

FIG. 9 is a block diagram of an example network side apparatus 900 that operates according to aspects of the application as described herein. Such a network side apparatus may include physical structure for performing other network side tasks and be located anywhere within the network that allows the device to operate accordingly. The example apparatus 900 includes a processor 910 and a processor readable storage device 920. The processor readable storage device 920 has stored thereon processor executable instructions 930 that when executed by the processor cause the processor to perform a method consistent with the methods described above. Components that may be included in the processor 910 or stored on the readable storage device 920 in the form of processor executable instructions 930 may include a sequence obtaining unit configured to obtain a first sequence, wherein the first sequence is a base sequence of a set of base sequences, the set of base sequences comprising sub group base sequences, the first sequence obtained by cyclically repeating the sub group sequences at least once.

The network side apparatus 900 may be a network device that is accessing, or part otherwise of, a telecommunications network. In one example, the network side apparatus 900 is a network-side device in a wireless or wireline telecommunications network, such as a base station, a relay station, a scheduler, a controller, a gateway, a router, an applications server, or any other device in the telecommunications network.

The processor 910 and/or processor executable instructions 930 stored on the readable storage device 920 may include any component or collection of components adapted to convert a baseband signal into a data signal and/or reference signal suitable for communication over a device-side interface(s), or vice-versa. The device-side interface(s) may include any component or collection of components adapted to communicate data-signals between the processor 910 and components within the host device (e.g., the processing system 800, local area network (LAN) ports, etc.).

The network side apparatus 900 may transmit and receive signaling over any type of communications medium. In some embodiments, the network side apparatus 900 transmits and receives signaling over a wireless medium. For example, the network side apparatus 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.).

The network side apparatus 900 may include one or more antenna/radiating elements. For example, the network-side 900 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the network side apparatus 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

In some embodiments, the processor may be a component of a general-purpose computer hardware platform. In other embodiments, the processor may be a component of a special-purpose hardware platform. For example, the processor may be an embedded processor, and the instructions may be provided as firmware. Some embodiments may be implemented by using hardware only. In some embodiments, the instructions for execution by a processor may be embodied in the form of a software product. The software product may be stored in a non-volatile or non-transitory storage medium, which can be, for example, a compact disc read-only memory (CD-ROM), universal serial bus (USB) flash disk, or a removable hard disk.

It should be appreciated that one or more steps of the embodiment methods provided herein may be performed by corresponding units or modules, according to FIG. 2A, 2B, 8 or 9. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Although a combination of features is shown in the illustrated embodiments, not all of them need to be combined to realize the benefits of various embodiments of this disclosure. In other words, a system or method designed according to an embodiment of this disclosure will not necessarily include all of the features shown in any one of the Figures or all of the portions schematically shown in the Figures. Moreover, selected features of one example embodiment may be combined with selected features of other example embodiments.

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

The previous description of some embodiments is provided to enable any person skilled in the art to make or use an apparatus, method, or processor readable medium according to the present disclosure. Various modifications to these embodiments will be readily apparent to those skilled in the art, and the generic principles of the methods and devices described herein may be applied to other embodiments. Thus, the present disclosure is not intended to be limited to the embodiments shown herein but is to be accorded the widest scope consistent with the principles and novel features disclosed herein.

What is claimed is:

1. A method comprising:
    obtaining, by a device, a first sequence, wherein the first sequence is a base sequence of a set of base sequences, the set of base sequences comprising sub group base sequences, the first sequence obtained by cyclically repeating the sub group sequences at least once, wherein the length of base sequences is m, the length of sub group base sequences is n, and m is equal to, or greater than, 1.5n+1; and transmitting, by the device, a reference signal based-on the first sequence.

2. The method of claim 1, wherein m is equal to, or greater than, 2n+1.

3. The method of claim 1, wherein the base sequence is $\bar{r}(n) = x_q(n \bmod N_{ZC}^{RS})$, $0 \le n < M_{sc}^{RS}$, where a $q^{th}$ root Zadoff-Chu sequence is defined by $$x_q(m) = \exp\left(-j\frac{\pi q m(m+1)}{N_{ZC}^{RS}}\right), 0 \le m \le N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $M_{sc}^{RS}/2$.

4. The method of claim 1, wherein the base sequence is $\bar{r}(n) = x_q(n \bmod N_{ZC}^{RS})$, $0 \le n < M_{sc}^{RS}$, where a $q^{th}$ root Zadoff-Chu sequence is defined by $$x_q(m) = \exp\left(-j\frac{\pi q m(m+1)}{N_{ZC}^{RS}}\right), 0 \le m \le N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $\eta M_{sc}^{RS}$ where $½ \le \eta \le ⅔$.

5. The method of claim 1, wherein a sequence index of the first sequence is derived by cell ID.

6. The method of claim 5, wherein the sequence index of the first sequence is obtained by the following:

$q = \lfloor \bar{q} + ½ \rfloor + v \cdot (-1)^{\lfloor 2\bar{q} \rfloor}$ $\bar{q} = N_{ZC}^{RS} \cdot (u+1)/31$ wherein q is the sequence index of the first sequence, u is sequence group number, v is the base sequence number for each sequence group and $N_{ZC}^{RS}$ is a length of the sub group base sequences.

7. The method of claim 5, wherein the sequence index of the first sequence is obtained by the following:

$q = \lfloor N_{ZC}^{RS}(u+1)/31 + ½ \rfloor$ wherein q is the sequence index of the first sequence, u is sequence group number and $N_{ZC}^{RS}$ is a length of the sub group base sequences.

8. The method of claim 1, wherein prior to transmitting the reference signal the method further comprises frequency domain spectral shaping (FDSS) the reference signal in the same manner as data for transmission.

9. The method of claim 8, wherein the data for transmission is a Discrete Fourier Transform spread Orthogonal Frequency Division Multiplexing (DFT-s-OFDM) signal that is modulated with π/2 Binary phase Shift Keying (BPSK).

10. The method of claim 1, wherein the reference signal is for enhanced Mobile BroadBand (eMBB) uplink data for up to 40 GHz.

11. A device comprising:
    a sequence obtaining unit configured to obtain, by the device, a first sequence, wherein the first sequence is a base sequence of a set of base sequences, the set of base sequences comprising sub group base sequences, the first sequence obtained by cyclically repeating the sub group sequences at least once, wherein the length of base sequences is m, the length of sub group base sequences is n, and m is equal to, or greater than, 1.5n+1; and a transmitter configured to transmit a reference signal based on the first sequence.

12. The device of claim 11, wherein m is equal to, or greater than, 2n+1.

13. The device of claim 11, wherein the base sequence is $$\vec{r}(n) = x_q(n \bmod N_{ZC}^{RS}), \quad 0 \leq n < M_{sc}^{RS},$$

where a $q^{th}$ root Zadoff-Chu sequence is defined by $$x_q(m) = \exp\left(-j\frac{\pi q m(m+1)}{N_{ZC}^{RS}}\right), \quad 0 \leq m \leq N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $M_{sc}^{RS}/2$.

14. The device of claim 11, wherein the base sequence is $$\vec{r}(n) = x_q(n \bmod N_{ZC}^{RS}), \quad 0 \leq n < M_{sc}^{RS},$$

where a $q^{th}$ root Zadoff-Chu sequence is defined by $$x_q(m) = \exp\left(-j\frac{\pi q m(m+1)}{N_{ZC}^{RS}}\right), \quad 0 \leq m \leq N_{ZC}^{RS} - 1,$$

wherein q is a sequence index, $N_{ZC}^{RS}$ is a length of the sub group base sequences and $M_{sc}^{RS}$ is a length of the base sequence, wherein $N_{ZC}^{RS}$ is a largest prime number less than $\eta M_{SC}^{RS}$ where $1/2 \leq \eta \leq 2/3$.

15. The device of claim 11, further comprising a spectral shaper unit configured to perform frequency domain spectral shaping of the reference signal in the same manner as data for transmission.

16. The device of claim 15, further comprising a modulator configured to modulate data for transmission using π/2 Binary Phase Shift Keying (BPSK) and wherein the data for transmission is a Discrete Fourier Transform spread Orthogonal Frequency Division Multiplexing (DFT-s-OFDM) signal.

17. A non-transitory computer-readable medium having stored thereon, computer-executable instructions that when executed by a processor, perform a method comprising:

obtaining a first sequence, wherein the first sequence is a base sequence of a set of base sequences, the set of base sequences comprising sub group base sequences, the first sequence obtained by cyclically repeating the sub group sequences at least once, wherein the length of base sequences is m, the length of sub group base sequences is n, and m is equal to, or greater than, 1.5n+1;

generating a reference signal based on the first sequence; and transmitting a reference signal based on the first sequence.

18. The non-transitory computer-readable medium of claim 17, wherein m is equal to, or greater than, 2n+1.

\* \* \* \* \*